United States Patent
Li (10) Patent No.: US 12,498,125 B2
(45) Date of Patent: Dec. 16, 2025

(54) DEHUMIDIFIER

(71) Applicant: GD MIDEA AIR-CONDITIONING EQUIPMENT CO., LTD., Foshan (CN)

(72) Inventor: Weiming Li, Foshan (CN)

(73) Assignee: GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 42 days.

(21) Appl. No.: 18/767,352

(22) Filed: Jul. 9, 2024

(65) Prior Publication Data

US 2024/0361013 A1 Oct. 31, 2024

Related U.S. Application Data

(63) Continuation of application No. 17/430,491, filed as application No. PCT/CN2020/135381 on Dec. 10, 2020, now Pat. No. 12,061,010.

(30) Foreign Application Priority Data

| Jul. 22, 2020 | (CN) | 202010715191.5 |
| Jul. 22, 2020 | (CN) | 202021467347.4 |
| Nov. 5, 2020 | (CN) | 202011226744.7 |

(51) Int. Cl.
*F24F 3/14* (2006.01)
*F24F 13/20* (2006.01)
(Continued)

(52) U.S. Cl.
CPC .............. *F24F 3/14* (2013.01); *F24F 13/20* (2013.01); *F24F 13/222* (2013.01); *F24F 13/28* (2013.01)

(58) Field of Classification Search
CPC .. F24F 3/14; F24F 13/20; F24F 13/222; F24F 13/28
(Continued)

(56) References Cited

U.S. PATENT DOCUMENTS

| 6,415,618 B1 | 7/2002 | Eom et al. |
| 9,732,969 B2 * | 8/2017 | Lee ..................... C02F 1/325 |

(Continued)

FOREIGN PATENT DOCUMENTS

| CN | 101520214 A | 9/2009 |
| CN | 101839541 A | 9/2010 |

(Continued)

OTHER PUBLICATIONS

World Intellectual Property Organization (WIPO) International Search Report and Written Opinion for PCT/CN2020/135381 Mar. 29, 2021 20 Pages (including translation).

(Continued)

*Primary Examiner* — Jon T. Schermerhorn, Jr.
(74) *Attorney, Agent, or Firm* — Anova Law Group, PLLC (57) ABSTRACT

A dehumidifier includes a water tank, a body having a working state, including a drainage position, and configured to extend out relative to the water tank in the working state, a drainage pump having a water inlet end communicated with the water tank and a water outlet end communicated with the drainage position, a joint assembly provided at a housing of the body with one end communicated with the water inlet end of the drainage pump, and an avoidance recess provided at an outer side surface of the housing and extending to a bottom of the body. The joint assembly is provided at and penetrates a bottom of the avoidance recess.

20 Claims, 5 Drawing Sheets

(51) Int. Cl.
*F24F 13/22* (2006.01)
*F24F 13/28* (2006.01)

(58) Field of Classification Search
USPC .......................................................... 62/271
See application file for complete search history.

(56) References Cited

U.S. PATENT DOCUMENTS

| | | | | |
|---|---|---|---|---|
| 11,247,170 | B2* | 2/2022 | Yoon | F24F 13/20 |
| 11,815,284 | B2* | 11/2023 | Li | F24F 13/22 |
| 11,874,016 | B2* | 1/2024 | Xing | F24F 1/0083 |
| 12,196,436 | B2* | 1/2025 | DeRossett | F24F 1/0358 |
| 12,298,033 | B2* | 5/2025 | Nutbeen | F24F 8/22 |
| 2007/0193634 | A1 | 8/2007 | Chiu | |
| 2008/0173035 | A1* | 7/2008 | Thayer | F24F 3/153 62/190 |
| 2017/0321907 | A1* | 11/2017 | Crawford | F24F 3/1405 |
| 2023/0018141 | A1* | 1/2023 | DeRossett | F26B 21/086 |
| 2023/0314013 | A1 | 10/2023 | Derossett et al. | |
| 2023/0314022 | A1* | 10/2023 | Chung | F24F 1/0083 62/93 |

FOREIGN PATENT DOCUMENTS

| | | | | |
|---|---|---|---|---|
| CN | 201637000 | U | 11/2010 | |
| CN | 202435976 | U | 9/2012 | |
| CN | 103574789 | A | 2/2014 | |
| CN | 104633770 | A | 5/2015 | |
| CN | 204555085 | U | 8/2015 | |
| CN | 106765544 | A | 5/2017 | |
| CN | 206338879 | U | 7/2017 | |
| CN | 206739571 | U | 12/2017 | |
| CN | 107859799 | A | 3/2018 | |
| CN | 108050602 | A | 5/2018 | |
| CN | 108151176 | A * | 6/2018 | F24F 3/1405 |
| CN | 108167954 | A * | 6/2018 | F24F 3/1405 |
| CN | 108758883 | A | 11/2018 | |
| CN | 208332519 | U | 1/2019 | |
| CN | 109780642 | A | 5/2019 | |
| CN | 110145816 | A | 8/2019 | |
| CN | 110748989 | A | 2/2020 | |
| CN | 111059649 | | 4/2020 | |
| CN | 111156618 | A | 5/2020 | |
| CN | 111156621 | A | 5/2020 | |
| CN | 210602191 | U | 5/2020 | |
| CN | 210921635 | U | 7/2020 | |
| CN | 211650551 | U | 10/2020 | |
| CN | 112178810 | A | 1/2021 | |
| JP | 2016073534 | A | 5/2016 | |
| KR | 20070107280 | A | 11/2007 | |
| TW | 202445062 | A * | 11/2024 | |

OTHER PUBLICATIONS

The China National Intelleectual Property Administration (CNIPA) The First Office Action for Chinese Application No. 202011226744.7 Jun. 28, 2021 25 Pages (including translation).

The China National Intellectual Property Administration (CNIPA) The Notification to Grant Patent Right for Invention for Chinese Application 202011226744.7, May 26, 2022 7 Pages (With Translation).

Haiping Zhou, "Design and Application Analysis of Continuous Drainage Joint of Dehumidifier" p. 865-869, China Academic Journal Electronic Publishing House.

* cited by examiner

DEHUMIDIFIER

CROSS-REFERENCE TO RELATED APPLICATIONS

This application is a continuation of application Ser. No. 17/430,491, filed on Aug. 12, 2021, which is National Stage Entry under 35 U.S.C. § 371 of International Application No. PCT/CN2020/135381, filed Dec. 10, 2020, which claims priority to Chinese Patent Application No. 202010715191.5, filed with China National Intellectual Property Administration on Jul. 22, 2020 and entitled "Dehumidifier," Chinese Patent Application No. 202021467347.4, filed with China National Intellectual Property Administration on Jul. 22, 2020 and entitled "Dehumidifier," and Chinese Patent Application No. 202011226744.7, filed with China National Intellectual Property Administration on Nov. 5, 2020 and entitled "Dehumidifier," the entire contents of all of which are incorporated herein by reference.

TECHNICAL FIELD

This application relates to the technical field of dehumidification equipment, in particular to a dehumidifier.

BACKGROUND

At present, all dehumidifiers need to manual tank emptying. However, the water tank is heavy after being filled water, which makes it laborious for users to carry the water tank for pouring water, and is very inconvenient for users to pour water.

SUMMARY

The main object of this application is to provide a dehumidifier, which aims to reduce the need for the user to remove the water tank to pour water.

In order to achieve the above object, the dehumidifier provided in this application includes:
  a body having a working state and including a drainage position;
  a water tank, the body being configured to extend out relative to the water tank in the working state; and,
  a drainage pump, a water inlet end of the drainage pump being communicated with the water tank, and a water outlet end of the drainage pump being communicated with the drainage position.

In an embodiment, the dehumidifier further includes a pump pipe, one end of the pump pipe being communicated with the water inlet end of the drainage pump, and the other end of the pump pipe being configured to extend into the water tank.

In an embodiment, the dehumidifier further includes a joint assembly provided at a housing of the body, one end of the joint assembly being communicated with the water inlet end of the drainage pump, the other end of the joint assembly being communicated with the pump pipe.

In an embodiment, the joint assembly is provided at a lateral side of the housing.

In an embodiment, the dehumidifier further includes an avoidance recess provided at an outer side surface of the housing and extending to a bottom of the body, the joint assembly being provided at and penetrating a bottom of the avoidance recess.

In an embodiment, the avoidance recess is one of avoidance recesses provided at the outer side surface of the housing, the avoidance recesses are distributed at intervals along a circumferential direction of the body, and the joint assembly is provided at and penetrates a bottom of one of the avoidance recesses; and
  the dehumidifier further includes support protrusions provided at an inner side surface of the water tank and distributed at intervals along a circumferential direction of the water tank, the support protrusions being configured to extend into the avoidance recesses in the idle state and support the bottom of the body by upper ends of the support protrusions in the working state.

In an embodiment, the joint assembly includes:
  a first pipe joint, one end of the first pipe joint being communicated with the water inlet end of the drainage pump, and the other end of the first pipe joint being configured to penetrate through the housing; and
  a second pipe joint including a first pipe and a second pipe connected to each other, the first pipe being connected to one end of the first pipe joint exposed outside the housing, and the second pipe being configured to extend downward and be connected to one end of the pump pipe.

In an embodiment, the first pipe joint is detachably connected to the second pipe joint; and/or, the pump pipe is detachably connected to the second pipe.

In an embodiment, the dehumidifier further includes a filter provided at one end of the pump pipe extending into the water tank.

In an embodiment, the filter includes:
  an upper cover including a water outlet hole connected to the pump pipe;
  a lower cover including a water inlet hole and detachably connected to the upper cover; and
  a filter screen disposed between the water outlet hole and the water inlet hole.

In an embodiment, the pump pipe is a hose.

In an embodiment, the body further has an idle state, and the body is at least partially accommodated in the water tank in the idle state.

This application further provides a dehumidifier, including:
  a body having an idle state and a working state, the body including a drainage position and a water hole;
  a water tank comprising an installation opening arranged upward, the body being at least partially accommodated in the water tank through the installation opening in the idle state; and the body being configured to extend out relative to the water tank through the installation opening with the drainage position being exposed outside the water tank in the working state;
  a drainage pump installed inside the body, a water inlet end of the drainage pump being communicated with an inner end of the water hole, and a water outlet end of the drainage pump being communicated with the drainage position; and,
  a pump pipe, an upper end of the pump pipe being communicated with an outer end of the water hole, and a lower end of the pump pipe being configured to extend into the water tank and extend toward a bottom of the water tank.

In an embodiment, the water hole is provided at a lateral side of the body.

In an embodiment, the dehumidifier further includes an avoidance recess provided at an outer side surface of the body and extending to a bottom of the body, the water hole being provided at a bottom of the avoidance recess.

In an embodiment:
the avoidance recess is one of avoidance recesses provided at the outer side surface of the body, the avoidance recesses are distributed at intervals along a circumferential direction of the body, and the water hole is provided at a bottom of one of the avoidance recesses; and
the dehumidifier further includes support protrusions provided at an inner side surface of the water tank and distributed at intervals along a circumferential direction of the water tank, the support protrusions being configured to extend into the avoidance recesses in the idle state and support the bottom of the body by upper ends of the support protrusions in the working state.

In an embodiment, the dehumidifier further includes a joint assembly provided in the water hole, both the water inlet end of the drainage pump and the upper end of the pump pipe being communicated with the joint assembly.

In an embodiment, the joint assembly includes:
a first pipe joint, one end of the first pipe joint being communicated with the water inlet end of the drainage pump, and the other end of the first pipe joint being configured to penetrate through the water hole; and
a second pipe joint including a first pipe and a second pipe connected to each other, the first pipe being connected to one end of the first pipe joint exposed outside the body, and the second pipe being configured to extend downward and be connected to the upper end of the pump pipe.

In an embodiment, the first pipe joint is detachably connected to the second pipe joint; and/or, the pump pipe is detachably connected to the second pipe.

In an embodiment, the dehumidifier further includes a filter provided at one end of the pump pipe away from the water hole.

In an embodiment, the filter includes:
an upper cover including a water outlet hole connected to the pump pipe;
a lower cover including a water inlet hole and detachably connected to the upper cover; and
a filter screen disposed between the water outlet hole and the water inlet hole.

In an embodiment, the pump pipe is a hose.

According to the technical solution of this application, the water tank is externally placed under the body in the working state. Compared with the technical solution of putting the water tank in the body, the water tank in this technical solution may have a larger volume, so as to accommodate more dehumidification water. Further, a drainage pump is provided in the body with a water inlet end of the drainage pump being communicated with the water tank, so that water in the water tank can be discharged through the drainage pump. In this way, the water in the water tank can be discharged without the water tank being removed, thus reducing the need for the user to remove the water tank to pour water.

BRIEF DESCRIPTION OF THE DRAWINGS

In order to more clearly describe the technical solutions in the embodiments of this application or the existing technology, the following will briefly introduce the drawings that need to be used in the description of the embodiments or the existing technology. Obviously, the drawings in the following description are only some embodiments of this application. For those of ordinary skill in the art, without creative work, other drawings can be obtained according to the structures shown in these drawings.

The realization of the object of this application, functional characteristics, and advantages will be further described in connection with the embodiments and with reference to the accompanying drawings.

DETAILED DESCRIPTION OF THE EMBODIMENTS

In the following, the technical solutions in the embodiments of this application will be clearly and completely described with reference to the drawings in the embodiments of this application. Obviously, the described embodiments are only a part of the embodiments of this application, but not all of the embodiments. Based on the embodiments of this application, all other embodiments obtained by those of ordinary skill in the art without creative efforts shall fall within the claimed scope of this application.

It should be noted that all directional indicators (such as up, down, left, right, front, back, etc.) in the embodiments of this application are only used to explain the relative positional relationship, movement situation, etc. between components in a specific posture (as shown in the drawings). If the specific posture changes, the directional indication also changes accordingly.

In addition, the descriptions related to "first," "second," and the like in this application are for descriptive purposes only, and cannot be understood as indicating or implying their relative importance or implicitly indicating the number of technical features indicated. Therefore, a features associated with "first" and "second" may explicitly or implicitly include at least one of such feature. In addition, the meaning of "and/or" in the full text is to include three scenarios. Take "A and/or B" as an example, it includes A technical solution, B technical solution, and technical solutions that A and B are both met. In addition, the technical solutions of the various embodiments can be combined with each other, but they must be based on what can be achieved by those of ordinary skill in the art. When the combination of technical solutions is contradictory or cannot be achieved, it should be considered that such a combination of technical solutions does not exist, or is not within the scope of protection defined by the claims of this application.

This application provides a dehumidifier.

Figure 1:
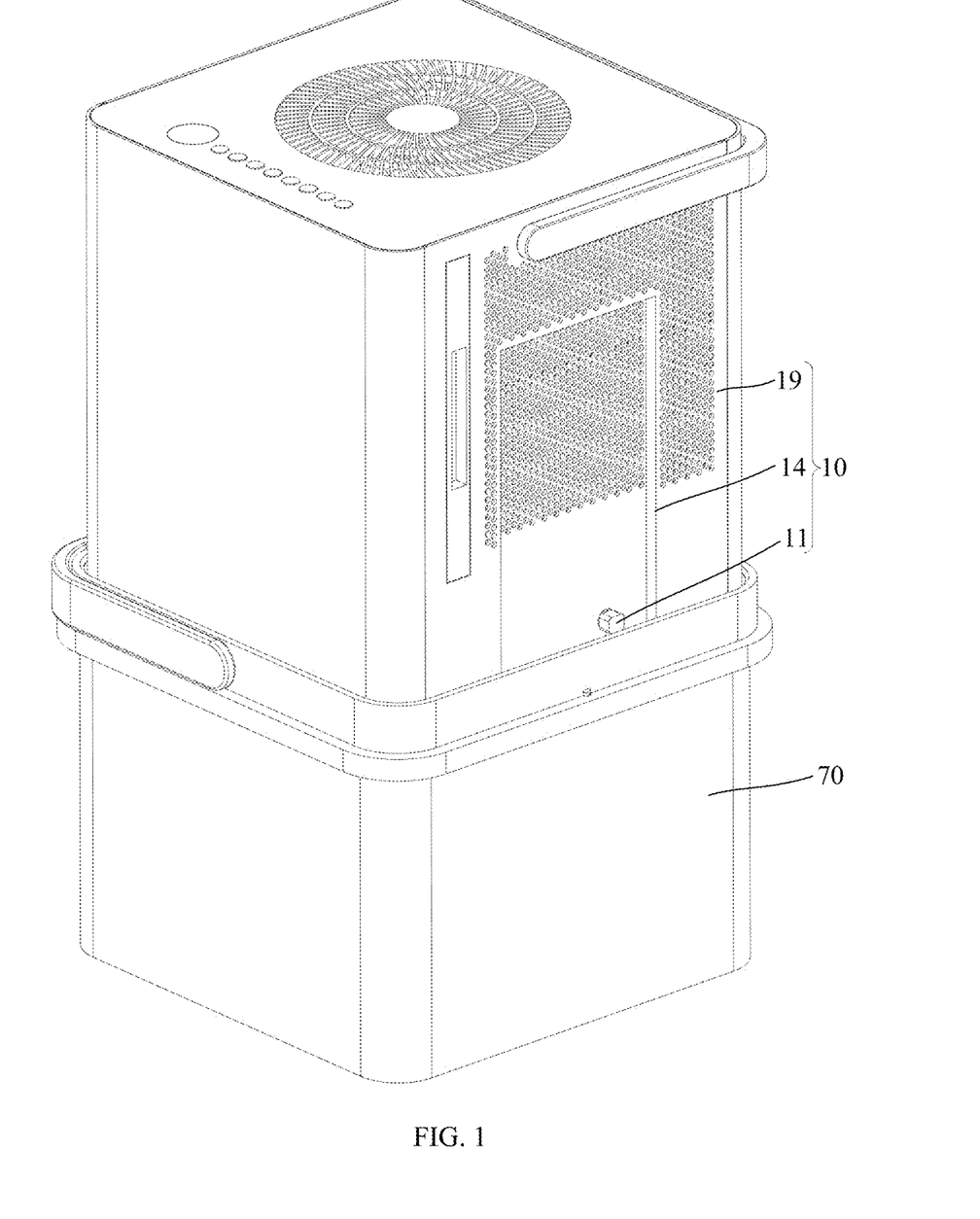
FIG. 1 is a structural diagram of a dehumidifier in a working state according to an embodiment of this application.
Figure 2:
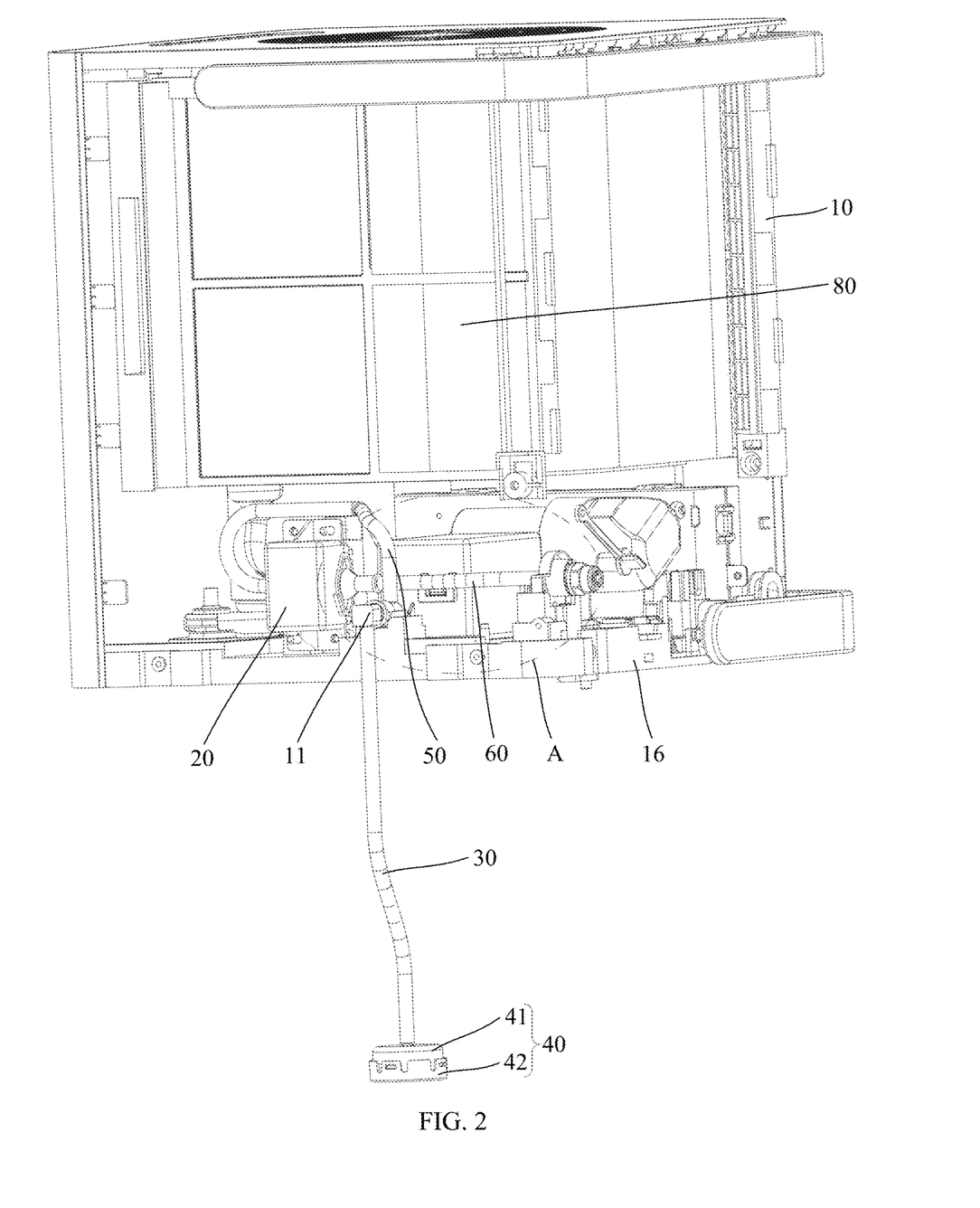
FIG. 2 is a schematic diagram showing an internal structure of the dehumidifier in FIG. 1.
Figure 3:
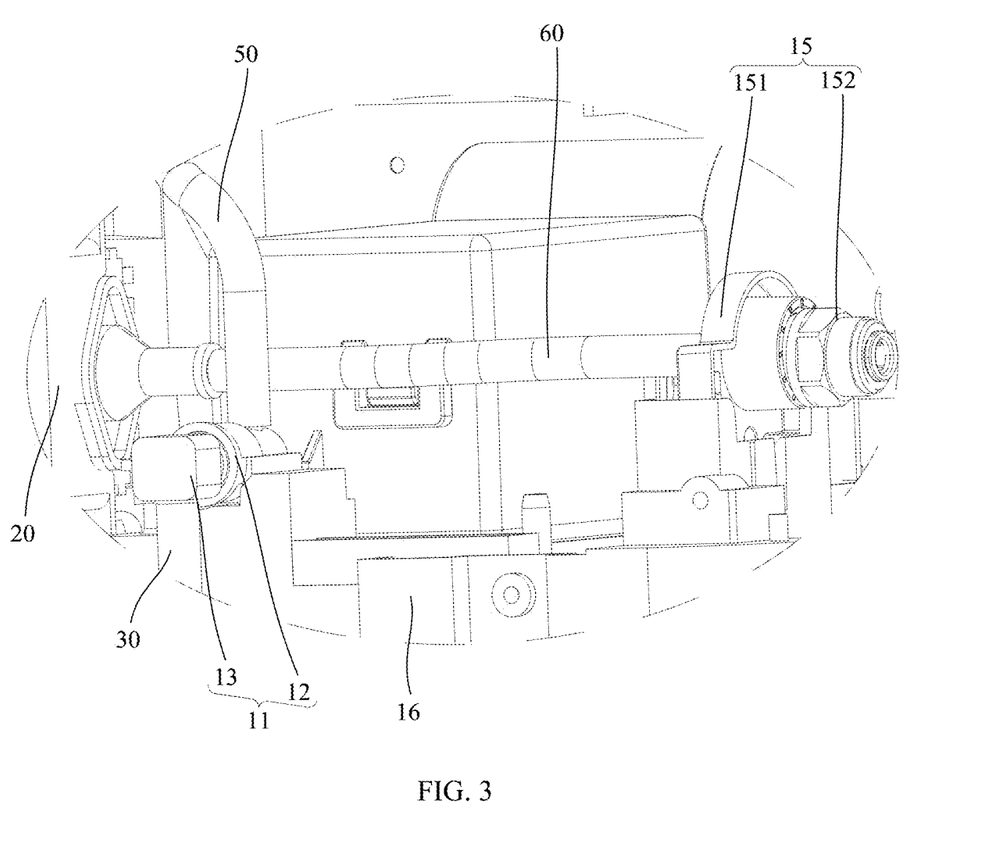
FIG. 3 is an enlarged view of portion A in FIG. 2.

Referring to FIGS. 1 to 3, in an embodiment of this application, the dehumidifier includes a water tank 70, a body 10, a drainage pump 20, and a pump pipe 30. The body 10 has an idle state and a working state. The body 10 includes a drainage position 15. The body 10 is at least partially accommodated in the water tank 70 in the idle state. The body 10 is configured to extend out relative to the water tank 70 in the working state. A water inlet end of the drainage pump 20 is communicated with the water tank, and a water outlet end of the drainage pump 20 is communicated with the drainage position 15.

Figure 4:
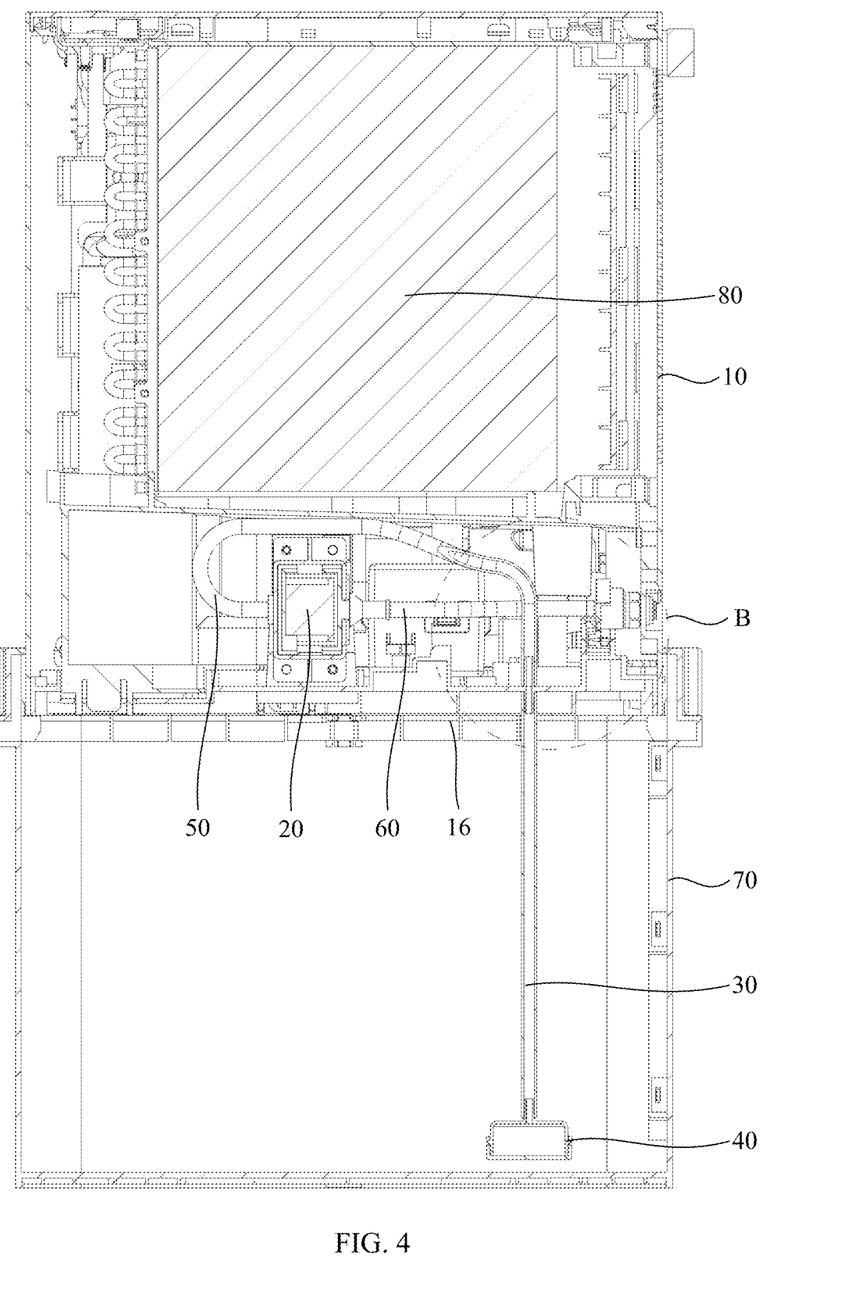
FIG. 4 is a cross-sectional view of the dehumidifier in the working state according to another embodiment of this application.

It can be understood that in this embodiment, the body 10 is provided with a dehumidification apparatus 80 inside (refer to FIG. 2 and FIG. 4). The dehumidification water produced by the dehumidification apparatus 80 can fall into the water tank 70 in the working state. In an embodiment, the dehumidification apparatus 80 includes a compressor, an evaporator and a condenser. The water vapor in the air is condensed into water droplets through the evaporator to be removed from the air. Then, the air with the water vapor being removed is heated and dried by the condenser to restore the blown air to normal temperature. Certainly, in other embodiments, the dehumidification apparatus 80 may also adopt another dehumidification method such as adsorption dehumidification.

In the working state, the body 10 is configured to extend out relative to the water tank 70, so that a bottom of the body 10 is spaced from a bottom of the water tank 70, thus, the dehumidification water generated by the dehumidification apparatus 80 inside the body 10 can be discharged into the water tank 70. The dehumidification water in the water tank 70 can be drawn out by the drainage pump 20 and discharged from the drainage position 15. The drainage pump 20 may operate to drain water from the water tank 70 during the dehumidification operation of the dehumidification apparatus 80 inside the body 10, or after the dehumidification apparatus 80 inside the body 10 finishes the dehumidification operation. After the water in the water tank 70 is completely drained, at least a part of the body 10 can be accommodated in the water tank 70, so that the body 10 is in the idle state. In the working state, the drainage position 15 may or may not be exposed outside the water tank 70.

According to the technical solution of this application, the water tank 70 is externally placed under the body 10 in the working state. Compared with the technical solution of putting the water tank 70 into the body 10, the water tank 70 in this technical solution may have a larger volume, so as to accommodate more dehumidification water. Further, a drainage pump 20 is provided at the body 10 with a water inlet end of the drainage pump 20 being communicated with the water tank 70, so that water in the water tank 70 can be discharged through the drainage pump 20. In this way, the water in the water tank 70 can be discharged without the water tank 70 being removed, thus reducing the need for the user to remove the water tank 70 to pour water.

In this embodiment, in the idle state, at least part of the body 10 can be accommodated in the water tank 70, which can reduce a center of gravity of the dehumidifier, so that the dehumidifier can be stably placed and not easy to overturn. Further, the overall occupied space of the dehumidifier is reduced, which is convenient for users to place the dehumidifier. In the working state, the body 10 is configured to extend out relative to the water tank 70, so that an air outlet on the body 10 has a higher position. In this way, the dehumidified air can be discharged to a higher position to spread to the entire indoor space more quickly.

In an embodiment, the dehumidifier further includes a pump pipe 30, one end of the pump pipe 30 being communicated with the water inlet end of the drainage pump 20, and the other end of the pump pipe 30 being configured to extend into the water tank 70. That is, the drainage pump 20 is fixed to the body 10, and is configured to extend into the water tank 70 through the pump pipe 30, so as to extract the dehumidification water in the water tank 70. As such, the structure is simple, which is beneficial to reduce the cost. Certainly, in other embodiments, the pump pipe 30 may not be provided, for example, the drainage pipe 20 may be up-down movably installed on the body 10.

In an embodiment, the dehumidifier further includes a joint assembly 11 provided at a housing 19 of the body 10, one end of the joint assembly 11 being communicated with the water inlet end of the drainage pump 20, and the other end of the joint assembly 11 being communicated with the pump pipe 30. That is, the drainage pump 20 is arranged inside the body 10, and the drainage pump 20 and the pump pipe 30 are connected through the joint assembly 11, so as to facilitate the installation of the pump pipe 30 and the pipeline between the pump pipe 30 and the drainage pump 20. The joint assembly 11 may be integrally formed with the housing 19 of the body, or, the housing 19 may also be provided with an avoidance hole, and the joint assembly 11 may be arranged in the avoidance hole. Certainly, in other embodiments, the housing 19 of the body 10 may be provided with an avoidance hole, so that the pump pipe 30 may be configured to penetrate through the avoidance hole to be connected to the drainage pump 20. Further, in other embodiments, the drainage pump 20 may also be arranged on the outside of the body 10, or, the body 10 is provided with an accommodation recess on the outer side surface and bottom surface, and the drainage pump 20 is arranged in the accommodation recess.

Further, the water inlet end of the drainage pump 20 may be connected to the joint assembly 11 through a connection pipe 50, and the water outlet end of the drainage pump 20 may be connected to the drainage position 15 through a water outlet pipe 60. Certainly, in other embodiments, the water inlet end of the drainage pump 20 may be directly connected to the joint assembly 11, and the water outlet end of the drainage pump 20 may be directly connected to the drainage position 15.

In an embodiment, the joint assembly 11 is provided at a lateral side of the housing 19. That is, the joint assembly 11 is located on the lateral side of the body 10, which is equivalent to that the pump pipe 30 is connected to the lateral side of the body 10. As such, it is convenient for the user to observe the position of the joint assembly 11 when assembling and disassembling the pump pipe 30, thereby facilitating the user to install the pump pipe 30 in position. It is also convenient for the user to check the connection status of the pump pipe 30 and the joint assembly 11, and it can avoid the situation where the pump pipe 30 is not correctly connected or the user does not know when it falls off. Certainly, in other embodiments, the joint assembly 11 may also be disposed at the bottom of the body 10.

In order to prevent the body 10 and the water tank 70 from being damaged due to rigid abutment of the pump pipe 30 with an inner wall of the water tank 70, in an embodiment, the pump pipe 30 is a hose. It can be understood that when the pump pipe 30 is arranged as a hose, even if the pump pipe 30 is squeezed because a distance between the outer side of the body 10 and the inner wall of the water tank 70 is smaller than a diameter of the pump pipe 30, rigid abutment of the pump pipe 30 between the water tank 70 and the body 10 won't happen, so that the possibility of damage to the body 10 and the water tank 70 is reduced. In addition, it can be conveniently stored by the user. Further, the pump pipe 30 can be arranged longer to contact a bottom wall of the water tank 70. It is possible to prevent rigid abutment of the pump pipe 30 with the bottom wall of the water tank 70, so that the lower end of the pump pipe 30 can be in better contact with the bottom wall of the water tank 70, and the water in the water tank 70 can be fully extracted. Certainly, in other embodiments, the pump pipe 30 may also be a rigid pipe.

In order to avoid interference between the pump pipe 30 and the inner side wall of the water tank 70, in an embodiment, the dehumidifier further includes an avoidance recess 14 provided at an outer side surface of the housing 19 and extending to a bottom of the body 10, the joint assembly 11 being provided at and penetrating a bottom of the avoidance recess 14. That is, the pump pipe 30 is configured to extend downward into the water tank 70 through the avoidance recess 14. By setting the avoidance recess 14, a protruding height of the pump pipe 30 relative to the outer surface of the body 10 can be reduced, so that when the body 10 is in the working state, it is possible to reduce the squeezing of the inner wall of the water tank 70 on the pump pipe 30, so as to ensure the suction effect of the pump pipe 30. It is also possible to further reduce the possibility that the pump pipe 30 interferes with the inner wall of the water tank 70, resulting in difficulty in putting the body 10 into the water tank 70, and reduce the possibility of crushing damage to the pump pipe 30. Further, by providing the avoidance recess 14, a gap between the outer side surface of the body 10 and the inner wall of the water tank 70 can be reduced, which is beneficial to reduce the volume of the water tank 70 and makes the overall structure of the dehumidifier more compact. Certainly, in other embodiments, the avoidance recess 14 may not be provided.

In an embodiment, the avoidance recess 14 is one of avoidance recesses 14 provided at the outer side surface of the housing 19, the avoidance recesses 14 are distributed at intervals along a circumferential direction of the body 10, and the joint assembly 11 is provided at and penetrates a bottom of one of the avoidance recesses 14. The dehumidifier further includes support protrusions (not shown) provided at an inner side surface of the water tank 70 and distributed at intervals along a circumferential direction of the water tank 70, the support protrusions being configured to extend into the avoidance recesses 14 in the idle state and support the bottom of the body 10 by upper ends of the support protrusions in the working state.

Specifically, the avoidance recess 14 is configured to extend along a height direction of the body 10. Each support protrusion corresponds to at least one avoidance recess 14 matched with it, that is, a number of the avoidance recesses 14 may be more than a number of the support protrusions, and each support protrusion is matched with at least one avoidance recess 14 to ensure that the body 10 can be accommodated in the water tank 70. When the avoidance recess 14 provided with the joint assembly 11 is matched with a support protrusion, the pump pipe 30 can be removed first before the body 10 is accommodated in the water tank 70, to avoid interference between the pump pipe 30 and the support protrusion.

It can be understood that the supporting protrusions are arranged at intervals along the circumferential direction of the water tank 70. When it is necessary to switch the body 10 from the idle state to the working state, the body 10 can be raised from the water tank 70 and rotated relative to the water tank 70 by a certain angle, so that the avoidance recesses 14 and the support protrusions are misaligned with each other, and one end of the support protrusion may support the part of the bottom of the body 10 that is not provided with the avoidance recess 14. As such, the body 10 can be fixed in the working state.

The support protrusions can be evenly arranged along the circumferential direction of the water tank 70, so as to ensure that the body 10 is stressed evenly in the circumferential direction when the bottom of the body 10 abuts with the support protrusions. It is beneficial to improve the stability of the body 10 in the working state. For example, when a number of the support protrusions is two, the two support protrusions are provided at opposite sides of the water tank 70. Certainly, in other embodiments, when the number of supporting protrusions is greater than or equal to three, the support protrusions may be arranged non-uniformly along the circumferential direction of the water tank 70. Further, the body 10 may be cylindrical, elliptical or prismatic, and the shape of the water tank 70 is adapted to the shape of the body 10. When the body 10 is prismatic, it can be square, regular pentagon or regular hexagon, etc.

The configuration of the joint assembly 11 may be one of many. For example, in an embodiment, the joint assembly 11 includes: a first pipe joint 12, one end of the first pipe joint 12 being communicated with the water inlet end of the drainage pump 20, and the other end of the first pipe joint 12 being configured to penetrate through the housing 19; and a second pipe joint 13 including a first pipe and a second pipe connected to each other, the first pipe being connected to one end of the first pipe joint 12 exposed outside the housing 19, and the second pipe being configured to extend downward and be connected to one end of the pump pipe 30. Specifically, the first pipe joint 12 is fixed to a chassis 16 of the body 10, and the first pipe of the second pipe joint 13 is connected to the first pipe joint 12 from the outside of the housing 19. The first pipe joint 12 is not higher than the recess bottom of the avoidance recess 14, that is, the first pipe joint 12 is concave toward the housing 19 in the recess bottom of the avoidance recess 14 or flush with the recess bottom of the avoidance recess 14. The second pipe joint 13 is arranged in a substantially "L" shape. This arrangement can reduce a height of the second pipe joint 13 protrudes relative to the outer side surface of the housing 19 (the body 10), thereby reducing a height of the pump pipe 30 protrudes relative to the outer side surface of the body 10, and further reducing the possibility of crushing damage to the pump pipe 30. One end of the first pipe joint 12 exposed from the avoidance hole is recessed inward or flush with the recess bottom of the avoidance recess 14, so that it is possible to avoid interference between the first pipe joint 12 and the support protrusions when the avoidance recesses 14 are matched with the support protrusions.

In an embodiment, the first pipe joint 12 is detachably connected to the second pipe joint 13; and/or, the pump pipe 30 is detachably connected to the second pipe. In this way, when the body 10 is accommodated in the water tank 70, the second pipe joint 13 and/or the pump pipe 30 can be removed to avoid a situation where the second pipe joint 13 and the pump pipe 30 interfere with the water tank 70 during the process of accommodating the body 10 into the water tank 70, and the body 10 cannot be normally accommodated in the water tank 70. Certainly, in other embodiments, the first pipe joint 12 and the second pipe joint 13 may also be integrally formed.

In order to avoid interference between the first pipe joint 12 and the water tank 70, in an embodiment, one end of the first pipe joint 12 exposed outside the housing 19 is a female joint, and the first pipe is a male joint, the first pipe is at least partially inserted into the first pipe joint 12. That is, the first pipe joint 12 exposed outside the housing 19 is inwardly retracted relative to the outer side surface of the housing 19 or flush with the outer side surface of the body 10 (in the embodiment of the configuration of the avoidance recess 14, that is, one end of the first pipe joint 12 exposed outside the housing 19 is inwardly retracted or flush with the recess bottom of the avoidance recess 14). In this way, the first pipe joint 12 is prevented from protruding from the outer side surface of the water tank 70, so that when the body 10 is put into the water tank 70, the first pipe joint 12 can be prevented from protruding from the outer side surface of the body 10 and interfering with the water tank 70.

In order to reduce the blockage of the drainage pump 20 caused by impurities such as dust particles entering the drainage pump 20, in an embodiment, one end of the pump pipe 30 extending into the water tank 70 is provided with a filter 40. That is, one end of the pump pipe 30 located at the bottom of the water tank 70 is provided with the filter 40, so as to filter impurities such as dust particles in the water in the water tank 70, and improve the situation where impurities enter the drainage pump 20 and cause the drainage pump 20 to block and fail. Moreover, the filter 40 is arranged outside the body 10, which can be easily replaced. In order to facilitate the replacement of the filter 40 or the pump pipe 30, in this embodiment, the filter 40 is detachably connected to the pump pipe 30. In addition, in other embodiments, the filter 40 may also be provided at the connection between the joint assembly 11 and the pump pipe 30, or the filter 40 may be omitted.

When the filter 40 is used for a long time, impurities in the filter 40 accumulate more, which will affect the water intake of the pump pipe 30, so the filter 40 needs to be replaced. In order to reduce the cost of replacing the filter 40 by the user, in an embodiment, the filter 40 includes an upper cover 41 including a water outlet hole connected to the pump pipe 30; a lower cover 42 including a water inlet hole and detachably connected to the upper cover 41; and a filter screen disposed between the water outlet hole and the water inlet hole. In this way, when the impurities in the filter 40 accumulate more, the user can disassemble the upper cover 41 and the lower cover 42 to replace the filter screen, so that the upper cover 41 and the lower cover 42 can be reused, which is beneficial to reduce the waste of resources, and does not need to replace the entire filter 40, which can reduce the user's use cost. The upper cover 41 and the lower cover 42 may be connected by screws or a screw structure, or the upper cover 41 and the lower cover 42 may be clamped.

In an embodiment, the drainage position 15 includes a drainage bracket 151 located on a lateral side of the body 10. The drainage bracket 151 includes a first interface facing inside the body 10 and a second interface facing outside the body 10, the water outlet end of the drainage pump 20 is communicated with the first interface, and the second interface is connected with a drainage joint 152. It can be understood that the drainage joint 152 is configured for external pipe connection. In this embodiment, by providing the drainage bracket 151 and the drainage joint 152, the water outlet pipe 60 of the drainage pump 20 and the external pipeline can be installed and attached, therefore, communication between the water outlet pipe 60 of the drainage pump 20 and the external pipeline can be realized more conveniently. In an embodiment, to facilitate the connection of the external pipeline, the drainage joint 152 is a quick joint. Further, in order to ensure the sealing between the drainage joint 152 and an external interface of the drainage bracket 151, while achieving the connection between the two, in an embodiment, the external interface of the drainage bracket 151 is threaded with the drainage joint 152.

Figure 5:
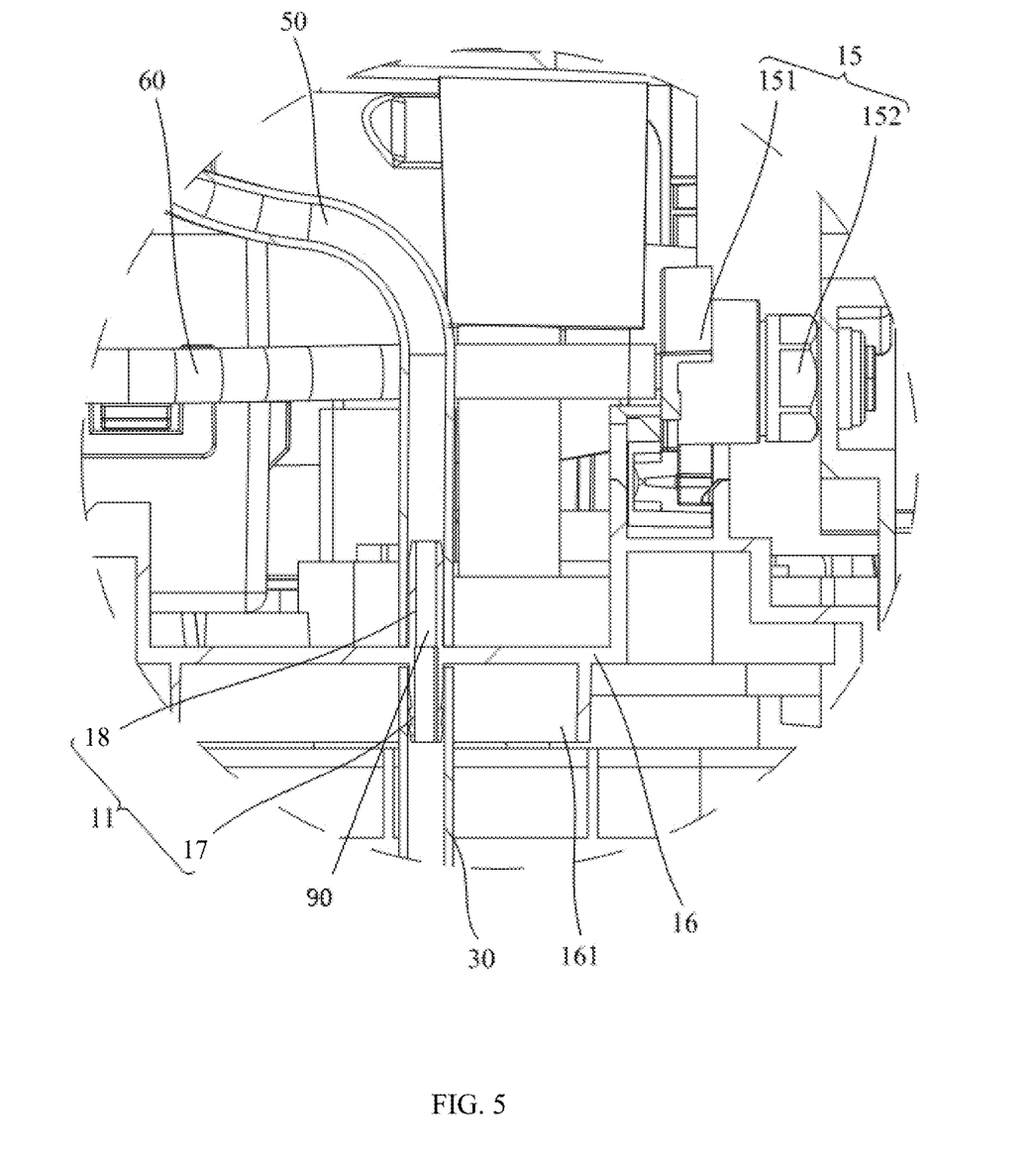
FIG. 5 is an enlarged view of portion B in FIG. 4.

Further, please refer to FIG. 4 and FIG. 5, in some embodiments, the joint assembly may not be provided at the lateral side of the housing 19 (body 10), for example, the joint assembly 11 may also be provided at the chassis 16 of the body 10, which is equivalent to connecting the pump pipe 30 to the bottom of the body 10, it is possible to avoid interference between the pump pipe 30 and the inner side wall of the water tank 70 during the process of putting the body 10 into the water tank 70 or taking the body 10 out of the water tank 70.

In order to facilitate the installation of the pump pipe 30, in an embodiment, the joint assembly 11 includes a third pipe joint 17, and one end of the pump pipe 30 is connected to the third pipe joint 17. The configuration of the third pipe joint 17 may be one of many, for example, in this embodiment, the third pipe joint 17 is integrally formed on an outer surface of the chassis 16 (that is, a surface of the chassis 16 facing away from the drainage pump 20), the pump pipe 30 is sleeved on the third pipe joint 17, so that the structure of the third pipe joint 17 is simple, and the third pipe joint 17 can be formed together when the chassis 16 is formed, which is beneficial to simplify the assembly process of the dehumidifier, moreover, the connection between the pump pipe 30 and the third pipe joint 17 is simple and convenient for the user to operate. However, the configuration is not limited thereto. In some embodiments, the third pipe joint 17 may be detachably connected to the chassis 16. For example, the third pipe joint 17 is a quick joint. In addition, in other embodiments, the third pipe joint 17 may not be provided, and the pump pipe 30 may be inserted into a through hole of the chassis.

In an embodiment, the pump pipe 30 is detachably connected to the third pipe joint 17. In this way, when the body 10 is in the idle state, the pump pipe 30 can be removed to avoid damage to the water tank 70, the body 10, and the pump pipe 30 caused by the pump pipe 30 abutting between the bottom of the water tank 70 and the bottom of the body 10 when accommodating the body 10 into the water tank 70. Certainly, in other embodiments, the pump pipe 30 and the third pipe joint 17 may also be non-detachably connected, for example, the pump pipe 30 and the third pipe joint 17 are bonded or welded.

In order to avoid interference between the third pipe joint 17 and the bottom wall of the water tank 70, in an embodiment, the outer surface of the chassis 16 is recessed with a receiving recess 161, the third pipe joint 17 is arranged at a bottom of the receiving recess 161, and a length of the third pipe joint 17 is not greater than a recess depth of the receiving recess 161. This can prevent the third pipe joint 17 from protruding from an edge of a notch of the receiving recess 161, so that when the body 10 is received into the water tank 70, the third pipe joint 17 can be prevented from contacting the bottom wall of the water tank 70 when the edge of the notch of the receiving recess 161 abuts against the bottom wall of the water tank 70. The configuration of the chassis 16 forming the receiving recess 161 may be one of many, for example, the receiving recess 161 may be formed by recessing the outer surface of the chassis 16 at a position corresponding to the third pipe joint 17. Or, the chassis 16 may also be provided with support ribs that are staggered in a grid-like distribution or spider-web distribution, and the receiving recess 161 is formed between the support ribs. Certainly, in other embodiments, the receiving recess 161 may be omitted.

In order to facilitate the connection between the drainage pump 20 and the joint assembly 11, in an embodiment, the joint assembly 11 further includes a fourth pipe joint 18, and the dehumidifier further includes a connection pipe 50, two ends of the connection pipe 50 are connected to the fourth pipe joint 18 and the water inlet end of the drainage pump 20, respectively. Specifically, the fourth pipe joint 18 is integrally formed on an inner surface of the chassis 16 (that is, a surface of the chassis 16 facing the drainage pump 20).

The connection pipe 50 is sleeved on the fourth pipe joint 18, so that the structure of the fourth pipe joint 18 is simple, and the fourth pipe joint 18 can be formed together when the chassis 16 is formed, which is beneficial to simplify the assembly process of the dehumidifier, moreover, the connection between the connection pipe 50 and the fourth pipe joint 18 is simple and convenient for the user to assemble. However, the configuration is not limited thereto. In some embodiments, the fourth pipe joint 18 may be detachably connected to the chassis 16. For example, the fourth pipe joint 18 is a quick joint. Further, in other embodiments, the fourth pipe joint 18 may not be provided, and the connection pipe 50 may be inserted into a through hole of the chassis 16.

The application further provides a dehumidifier.

Referring to FIGS. 1 to 3, in an embodiment of this application, the dehumidifier includes a water tank 70, a body 10, a drainage pump 20, and a pump pipe 30. The body 10 has an idle state and a working state. The body 10 includes a drainage position 15 and a water hole 90. The water tank 70 includes an installation opening arranged upward, and the body 10 is at least partially accommodated in the water tank 70 through the installation opening in the idle state. The body 10 is configured to extend out of the water tank 70 through the installation opening, and the drainage position 15 is exposed outside the water tank 70 in the working state. The drainage pump 20 is installed inside the body 10, a water inlet end of the drainage pump 20 is communicated with an inner end of the water hole 90, and a water outlet end of the drainage pump 20 is communicated with the drainage position 15. An upper end of the pump pipe 30 is communicated with an outer end of the water hole 90, and a lower end of the pump pipe 30 is configured to extend into the water tank 70 and extend toward a bottom of the water tank 70.

In this embodiment, the installation opening is set open, so that the side wall of the water tank 70 can provide downward guidance for the receiving insertion of the body 10, and the opening can facilitate receiving water droplets formed by dehumidification. Certainly, in other embodiments, the installation opening may not be provided as open. Further, the water inlet end of the drainage pump 20 may be connected to the inner end of the water hole 90 through a connection pipe 50, and the water outlet end of the drainage pump 20 may be connected to the drainage position 15 through a water outlet pipe 60. Certainly, in other embodiments, the water inlet end of the drainage pump 20 may be directly connected to the inner end of the water hole 90, and the water outlet end of the drainage pump 20 may be directly connected to the drainage position 15.

In the working state, the body 10 is configured to extend out relative to the water tank 70, so that a bottom of the body 10 is spaced from a bottom of the water tank 70, thus, the dehumidification water generated by the dehumidification apparatus inside the body 10 can be discharged into the water tank 70. The lower end of the pump pipe 30 can be extended to the bottom of the water tank 70, so that when there is water in the water tank 70, the water in the water tank 70 can be pumped out through the drainage pump 20 and the pump pipe 30, and drain from drainage position 15. The drainage pump 20 may operate to drain water from the water tank 70 during the dehumidification operation of the dehumidification apparatus inside the body 10, or after the dehumidification apparatus inside the body 10 finishes the dehumidification operation. After the water in the water tank 70 is completely drained, at least a part of the body 10 can be accommodated in the water tank 70, so that the body 10 is in an idle state.

According to the technical solution of this application, the water tank 70 is externally placed under the body 10. Compared with the technical solution of putting the water tank 70 into the body 10, the water tank 70 in this technical solution may have a larger volume, so as to accommodate more dehumidification water. Further, by setting the water hole 90 in the body 10, the water inlet end of the drainage pump 20 inside the body 10 is communicated with the inner end of the water hole 90, and the upper end of the pump pipe 30 is communicated with the outer end of the water hole 90, so that the lower end of the pump pipe 30 extends toward the bottom of the water tank 70. As such, water in the water tank 70 can be discharged through the drainage pump 20 and the pump pipe 30. In this way, the water in the water tank 70 can be discharged without the water tank 70 being removed, thus reducing the need for the user to remove the water tank 70 to pour water.

In this embodiment, the pump pipe 30 is detachably connected to the outer end of the water hole 90, and in order to facilitate the user to disassemble and assemble the pump pipe 30, in an embodiment, the water hole 90 is disposed at a lateral side of the body 10. That is, the outer end of the water hole 90 is located on the lateral side of the body 10, and the upper end of the pump pipe 30 is connected to the lateral side of the body 10. As such, it is convenient for the user to observe the position of the water hole 90 when assembling and disassembling the pump pipe 30, thereby facilitating the user to install the pump pipe 30 in the water hole 90 in position. It is also convenient for the user to check the connection status of the pump pipe 30 and the water hole 90, and it can avoid the situation where the pump pipe 30 is not correctly connected or the user does not know when it falls off.

In order to prevent the body 10 and the water tank 70 from being damaged due to rigid abutment of the pump pipe 30 with an inner wall of the water tank 70, in an embodiment, the pump pipe 30 is a hose. It can be understood that when the pump pipe 30 is arranged as a hose, even if the pump pipe 30 is squeezed because a distance between the outer side of the body 10 and the inner wall of the water tank 70 is smaller than a diameter of the pump pipe 30, rigid abutment of the pump pipe 30 between the water tank 70 and the body 10 won't happen, so that the possibility of damage to the body 10 and the water tank 70 is reduced. Further, it can be conveniently stored by the user. Further, the pump pipe 30 can be arranged longer to contact the bottom wall of the water tank 70. Further, it is possible to prevent rigid abutment of the pump pipe 30 with the bottom wall of the water tank 70, so that the lower end of the pump pipe 30 can be in better contact with the bottom wall of the water tank 70, so that the water in the water tank 70 can be fully extracted. Certainly, in other embodiments, the pump pipe 30 may also be a rigid pipe.

In order to avoid interference between the pump pipe 30 and the inner side wall of the water tank 70, in an embodiment, the dehumidifier further includes an avoidance recess 14 provided at an outer side surface of the body 10 and extending to a bottom of the body 10, and the joint assembly 90 is provided at and penetrates a bottom of the avoidance recess 14. That is, the pump pipe 30 is configured to extend upward into the water tank 70 through the avoidance recess 14. By setting the avoidance recess 14, a protruding height of the pump pipe 30 relative to the outer surface of the body 10 can be reduced, so that when the body 10 is in the working state, it is possible to reduce the squeezing of the inner wall of the water tank 70 on the pump pipe 30, so as to ensure the pumping effect of the pump pipe 30. It is also possible to further reduce the possibility that the pump pipe 30 interferes with the inner wall of the water tank 70, resulting in difficulty in putting the body 10 into the water tank 70, and reduce the possibility of crushing damage to the pump pipe 30. Further, by providing the avoidance recess 14, a gap between the outer side surface of the body 10 and the inner wall of the water tank 70 can be reduced, which is beneficial to reduce the volume of the water tank 70 and makes the overall structure of the dehumidifier more compact. Certainly, in other embodiments, the avoidance recess 14 may be omitted.

In an embodiment, the avoidance recess 14 is one of avoidance recesses 14 provided at the outer side surface of the body 10, the avoidance recesses 14 are distributed at intervals along a circumferential direction of the body 10, and the water hole 90 is provided at a bottom of one of the avoidance recesses 14. The dehumidifier further includes support protrusions provided at an inner side surface of the water tank 70 and distributed at intervals along a circumferential direction of the water tank 70, the support protrusions being configured to extend into the avoidance recesses 14 in the idle state and support the bottom of the body 10 by upper ends of the support protrusions in the working state.

Specifically, the avoidance recess 14 is configured to extend along a height direction of the body 10. Each support protrusion corresponds to at least one avoidance recess 14 matched with it, that is, a number of the avoidance recesses 14 may be more than a number of the support protrusions, and each support protrusion is matched with at least one avoidance recess 14 to ensure that the body 10 can be accommodated in the water tank 70. When the avoidance recess 14 provided with the water hole 90 is matched with a support protrusion, the pump pipe 30 can be removed first before the body 10 is accommodated in the water tank 70, to avoid interference between the pump pipe 30 and the support protrusion.

It can be understood that the supporting protrusions are arranged at intervals along the circumferential direction of the water tank 70. When it is necessary to switch the body 10 from the idle state to the working state, the body 10 can be raised from the water tank 70 and rotated relative to the water tank 70 by a certain angle, so that the avoidance recesses 14 and the support protrusions are misaligned with each other, and an upper end of the support protrusion may support the part of the bottom of the body 10 that is not provided with the avoidance recess 14. As such, the body 10 can be fixed in the working state.

The support protrusions can be evenly arranged along the circumferential direction of the water tank 70, so as to ensure that the body 10 is stressed evenly in the circumferential direction when the bottom of the body 10 abuts with the support protrusions. It is beneficial to improve the stability of the body 10 in the working state. For example, when a number of the support protrusions is two, the two support protrusions are provided at opposite sides of the water tank 70. Certainly, in other embodiments, when the number of supporting protrusions is greater than or equal to three, the support protrusions may be arranged non-uniformly along the circumferential direction of the water tank 70. Further, the body 10 may be cylindrical, elliptical or prismatic, and the shape of the water tank 70 is adapted to the shape of the body 10. When the body 10 is prismatic, it can be square, regular pentagon or regular hexagon, etc.

In an embodiment, the dehumidifier further includes a joint assembly provided in the water hole 90, and both the water inlet end of the drainage pump 20 and the upper end of the pump pipe 30 are communicated with the joint assembly. That is, the drainage pump 20 and the pump pipe 30 are connected through the joint assembly, so as to facilitate the installation of the pipeline between the pump pipe 30 and the drainage pump 20. Certainly, in other embodiments, the water hole 90 can also be directly through the lateral side of the body 10, so that the pump pipe 30 passes through the water hole 90 and is connected with the drainage pump 20, at this time, the water hole 90 is equivalent to a pipe through hole. In some embodiments, the connection pipe 50 can also be directly connected from the inner end of the water hole 90 in the water hole 90, and the pump pipe 30 can also be directly connected from the outer end of the water hole 90 in the water hole 90, at this time, the water hole 90 is a water passage connecting the pump pipe 30 and the connection pipe 50.

The configuration of the joint assembly may be one of many. For example, in an embodiment, the joint assembly includes: a first pipe joint 12, one end of the first pipe joint 12 being communicated with the water inlet end of the drainage pump 20, and the other end of the first pipe joint 12 being configured to penetrate through the water hole 90; and a second pipe joint 13 including a first pipe and a second pipe connected to each other, the first pipe being connected to one end of the first pipe joint 12 exposed outside the body 10, and the second pipe being configured to extend downward and be connected to an upper end of the pump pipe 30. Specifically, the first pipe joint 12 is fixed on the chassis 16 of the body 10. In this embodiment, the water hole 90 is equivalent to the pipe through hole, and one end of the first pipe joint 12 is exposed from the water hole 90. The first pipe of the second pipe joint 13 is connected to the first pipe joint 12 from the outside of the body 10, and the second pipe joint 13 is arranged in a substantially "L" shape. This arrangement can reduce a height of the second pipe joint 13 protrudes relative to the outer side surface of the body 10, thereby reducing a height of the pump pipe 30 protrudes relative to the outer side surface of the body 10, and further reducing the possibility of crushing damage to the pump pipe 30.

In an embodiment, the first pipe joint 12 is detachably connected to the second pipe joint 13; and/or, the pump pipe 30 is detachably connected to the second pipe. In this way, when the body 10 is accommodated in the water tank 70, the second pipe joint 13 and/or the pump pipe 30 can be removed to avoid a situation where the second pipe joint 13 and the pump pipe 30 interfere with the water tank 70 during the process of accommodating the body 10 into the water tank 70, and the body 10 cannot be normally accommodated in the water tank 70. Certainly, in other embodiments, the first pipe joint 12 and the second pipe joint 13 may also be integrally formed.

In order to avoid interference between the first pipe joint 12 and the water tank 70, in an embodiment, one end of the first pipe joint 12 exposed from the water hole 90 is a female joint and located inside the water hole 90, the first pipe is a male joint, and the first pipe is at least partially inserted into the first pipe joint 12. It should be noted that the end of the first pipe joint 12 exposed from the water hole 90 is located inside the water hole 90, which means that the end of the first pipe joint 12 exposed from the water hole 90 does not protrude from an outer end hole edge of the water hole 90, that is, the end of the first pipe joint 12 exposed from the water hole 90 does not protrude from the outer side surface of the body 10. That is, the end of the first pipe joint 12 exposed from the water hole 90 is retracted inward relative to the outer side surface of the body 10 or flush with the outer side surface of the body 10. In this way, the first pipe joint 12 is prevented from protruding from the outer side surface of the water tank 70, so that when the body 10 is put into the water tank 70, the first pipe joint 12 can be prevented from protruding from the outer side surface of the body 10 and interfering with the water tank 70.

In the embodiment in which the water hole 90 is provided in the avoidance recess 14, the above-mentioned "outer side surface of the body 10" refers to the recess bottom of the avoidance recess 14. That is, the end of the first pipe joint 12 exposed from the water hole 90 is recessed inward or flush with the recess bottom of the avoidance recess 14, so that it is possible to avoid interference between the first pipe joint 12 and the support protrusions when the avoidance recesses 14 are matched with the support protrusions.

In order to reduce the blockage of the drainage pump 20 caused by impurities such as dust particles entering the drainage pump 20, in an embodiment, one end of the pump pipe 30 away from the water hole 90 is provided with a filter 40. That is, one end of the pump pipe 30 located at the bottom of the water tank 70 is provided with the filter 40, so as to filter impurities such as dust particles in the water in the water tank 70, and improve the situation where impurities enter the drainage pump 20 and cause the drainage pump 20 to block and fail. Moreover, the filter 40 is arranged outside the body 10, which can be easily replaced. In order to facilitate the replacement of the filter 40 or the pump pipe 30, in this embodiment, the filter 40 is detachably connected to the pump pipe 30. In addition, in other embodiments, the filter 40 may also be provided at the water hole 90, or the filter 40 may not be provided.

When the filter 40 is used for a long time, impurities in the filter 40 accumulate more, which will affect the water intake of the pump pipe 30, so the filter 40 needs to be replaced. In order to reduce the cost of replacing the filter 40 by the user, in an embodiment, the filter 40 includes an upper cover 41 including a water outlet hole connected to the pump pipe 30; a lower cover 42 including a water inlet hole and detachably connected to the upper cover 41; and a filter screen disposed between the water outlet hole and the water inlet hole. In this way, when the impurities in the filter 40 accumulate more, the user can disassemble the upper cover 41 and the lower cover 42 to replace the filter screen, so that the upper cover 41 and the lower cover 42 can be reused, which is beneficial to reduce the waste of resources, and does not need to replace the entire filter 40, which can reduce the user's use cost. The upper cover 41 and the lower cover 42 may be connected by screws or a screw structure, or the upper cover 41 and the lower cover 42 may be clamped.

In an embodiment, the drainage position 15 includes a drainage bracket 151 located on a lateral side of the body 10. The drainage bracket 151 includes a first interface facing inside the body 10 and a second interface facing outside the body 10, the water outlet end of the drainage pump 20 is communicated with the first interface, and the second interface is connected with a drainage joint 152. It can be understood that the drainage joint 152 is configured for external pipe connection. In this embodiment, by providing the drainage bracket 151 and the drainage joint 152, the water outlet pipe 60 of the drainage pump 20 and the external pipeline can be installed and attached, therefore, communication between the water outlet pipe 60 of the drainage pump 20 and the external pipeline can be realized more conveniently. In an embodiment, to facilitate the connection of the external pipeline, the drainage joint 152 is a quick joint. Further, in order to ensure the sealing between the drainage joint 152 and an external interface of the drainage bracket 151, while achieving the connection between the two, in an embodiment, the external interface of the drainage bracket 151 is threaded with the drainage joint 152.

Further, please refer to FIG. 4 and FIG. 5, in some embodiments, the water hole 90 may not be provided at the lateral side of the body 10, for example, the water hole 90 may also be provided at the chassis 16 of the body 10, which is equivalent to connecting the pump pipe 30 to the bottom of the body 10, it is possible to avoid interference between the pump pipe 30 and the inner side wall of the water tank 70 during the process of putting the body 10 into the water tank 70 or taking the body 10 out of the water tank 70.

In order to facilitate the installation of the pump pipe 30, in an embodiment, the outer end of the water hole 90 is provided with a third pipe joint 17, and the upper end of the pump pipe 30 is connected to the third pipe joint 17. The configuration of the third pipe joint 17 may be one of many, for example, in this embodiment, the third pipe joint 17 is integrally formed on an outer surface of the chassis 16 (that is, a surface of the chassis 16 facing away from the drainage pump 20), and extends along the axial direction of the water hole 90. The pump pipe 30 is sleeved on the third pipe joint 17, so that the structure of the third pipe joint 17 is simple, and the third pipe joint 17 can be formed together when the chassis 16 is formed, which is beneficial to simplify the assembly process of the dehumidifier, moreover, the connection between the pump pipe 30 and the third pipe joint 17 is simple and convenient for the user to operate. However, the configuration is not limited thereto. In some embodiments, the third pipe joint 17 may be detachably connected to the chassis 16. For example, the third pipe joint 17 is a quick joint. In addition, in other embodiments, the third pipe joint 17 may be omitted, and the pump pipe 30 may be inserted into the water hole 90.

In an embodiment, the pump pipe 30 is detachably connected to the third pipe joint 17. In this way, when the body 10 is in the idle state, the pump pipe 30 can be removed to avoid damage to the water tank 70, the body 10, and the pump pipe 30 caused by the pump pipe 30 abutting between the bottom of the water tank 70 and the bottom of the body 10 when accommodating the body 10 into the water tank 70. Certainly, in other embodiments, the pump pipe 30 and the third pipe joint 17 may also be non-detachably connected, for example, the pump pipe 30 and the third pipe joint 17 are bonded or welded.

In order to avoid interference between the third pipe joint 17 and the bottom wall of the water tank 70, in an embodiment, the outer surface of the chassis 16 is recessed with a receiving recess 161, the water hole 90 is arranged at a bottom of the receiving recess 161, and a length of the third pipe joint 17 is not greater than a recess depth of the receiving recess 161. This can prevent the third pipe joint 17 from protruding from an edge of a notch of the receiving recess 161, so that when the body 10 is received into the water tank 70, the third pipe joint 17 can be prevented from contacting the bottom wall of the water tank 70 when the edge of the notch of the receiving recess 161 abuts against the bottom wall of the water tank 70. The configuration of the chassis 16 forming the receiving recess 161 may be one of many, for example, the receiving recess 161 may be formed by recessing the outer surface of the chassis 16 at a position corresponding to the water hole 90. Or, the chassis 16 may also be provided with support ribs that are staggered in a grid-like distribution or spider-web distribution, and the receiving recess 161 is formed between the support ribs. Certainly, in other embodiments, the receiving recess 161 may be omitted.

In order to facilitate the connection between the drainage pump 20 and the water hole 90, in an embodiment, the inner end of the water hole 90 is further provided with a fourth pipe joint 18, and the dehumidifier further includes a connection pipe 50, two ends of the connection pipe 50 are connected to the fourth pipe joint 18 and the water inlet end of the drainage pump 20, respectively. Specifically, the fourth pipe joint 18 is integrally formed on an inner surface of the chassis 16 (that is, a surface of the chassis 16 facing the drainage pump 20), and extends in the axial direction of the water hole 90. The connection pipe 50 is sleeved on the third pipe joint 17, so that the structure of the fourth pipe joint 18 is simple, and the fourth pipe joint 18 can be formed together when the chassis 16 is formed, which is beneficial to simplify the assembly process of the dehumidifier, moreover, the connection between the connection pipe 50 and the fourth pipe joint 18 is simple and convenient for the user to assemble. However, the configuration is not limited thereto. In some embodiments, the third pipe joint 17 may be detachably connected to the chassis 16. For example, the third pipe joint 17 is a quick joint. In addition, in other embodiments, the fourth pipe joint 18 may be omitted, and the connection pipe 50 may be inserted into the water hole 90.

The above are only preferable embodiments of this application, and thus does not limit the scope of this application, and the equivalent structural transformation made by the content of the specification and the drawings of this application, or directly/indirectly applied to other related technical fields are all included in the scope of this application.

What is claimed is:

1. A dehumidifier comprising:
   a water tank;
   a body having a working state and including a drainage position, the body being configured to extend out relative to the water tank in the working state;
   a drainage pump, a water inlet end of the drainage pump being communicated with the water tank, and a water outlet end of the drainage pump being communicated with the drainage position;
   a joint assembly provided at a housing of the body, one end of the joint assembly being communicated with the water inlet end of the drainage pump; and
   an avoidance recess provided at an outer side surface of the housing and extending to a bottom of the body;
   wherein the joint assembly is provided at and penetrates a bottom of the avoidance recess.

2. The dehumidifier of claim 1, wherein the joint assembly is provided at a lateral side of the housing.

3. The dehumidifier of claim 1, wherein the body further has an idle state, and the body is at least partially accommodated in the water tank in the idle state.

4. The dehumidifier of claim 1, wherein the avoidance recess is one of a plurality of avoidance recesses provided at the outer side surface of the housing and distributed at intervals along a circumferential direction of the body.

5. The dehumidifier of claim 4, further comprising:
   a plurality of support protrusions provided at an inner side surface of the water tank and distributed at intervals along a circumferential direction of the water tank;
   wherein:
      the body further has an idle state, and the body is at least partially accommodated in the water tank in the idle state; and
      the support protrusions are configured to:
         extend into the avoidance recesses in the idle state; and
         support the bottom of the body by upper ends of the support protrusions in the working state.

6. The dehumidifier of claim 1, further comprising:
   a pump pipe, a first end of the pump pipe being communicated with the water inlet end of the drainage pump, and a second end of the pump pipe being configured to extend into the water tank.

7. The dehumidifier of claim 6, wherein another end of the joint assembly being communicated with the pump pipe.

8. The dehumidifier of claim 6, wherein the joint assembly includes:
   a first pipe joint, a first end of the first pipe joint being communicated with the water inlet end of the drainage pump, and a second end of the first pipe joint being configured to penetrate through the housing to expose to outside of the housing; and
   a second pipe joint including:
      a first pipe connected to the second end of the first pipe joint; and
      a second pipe connected to the first pipe and configured to extend downward and be connected to the first end of the pump pipe.

9. The dehumidifier of claim 8, wherein the first pipe joint is detachably connected to the second pipe joint.

10. The dehumidifier of claim 8, wherein the pump pipe is detachably connected to the second pipe.

11. The dehumidifier of claim 1, further comprising:
    a pump pipe;
    wherein:
       the water tank includes an installation opening arranged upward;
       in the idle state, the body is at least partially accommodated in the water tank through the installation opening;
       the body further has a working state, in which the body extends out relative to the water tank through the installation opening with the drainage position being exposed outside the water tank;
       the body further includes a water hole;
       the drainage pump is located inside the body, and the water inlet end of the drainage pump is communicated with an inner end of the water hole; and
       an upper end of the pump pipe is communicated with an outer end of the water hole, and a lower end of the pump pipe is configured to extend into the water tank and toward a bottom of the water tank.

12. The dehumidifier of claim 11, wherein the water hole is provided at a lateral side of the body.

13. The dehumidifier of claim 11, wherein the water hole is provided at a bottom of the avoidance recess.

14. The dehumidifier of claim 11, further comprising:
    a plurality of support protrusions provided at an inner side surface of the water tank and distributed at intervals along a circumferential direction of the water tank;
    wherein:
       the avoidance recess is one of a plurality of avoidance recesses provided at the outer side surface of the body and distributed at intervals along a circumferential direction of the body; and
       the support protrusions are configured to:
          extend into the avoidance recesses in the idle state; and
          support the bottom of the body by upper ends of the support protrusions in the working state.

15. The dehumidifier of claim 11, wherein:
    the joint assembly is provided in the water hole; and the upper end of the pump pipe are communicated with the joint assembly.

16. The dehumidifier of claim 11, wherein the joint assembly includes:
a first pipe joint, a first end of the first pipe joint being communicated with the water inlet end of the drainage pump, and a second end of the first pipe joint being configured to penetrate through the water hole to expose to outside of the body; and
a second pipe joint including:
a first pipe connected to the second end of the first pipe joint; and
a second pipe connected to the first pipe and configured to extend downward and be connected to the upper end of the pump pipe.

17. The dehumidifier of claim 16, wherein:
the first pipe joint is detachably connected to the second pipe joint; and/or
the pump pipe is detachably connected to the second pipe.

18. The dehumidifier of claim 11, further comprising:
a filter provided at the lower end of the pump pipe.

19. The dehumidifier of claim 18, wherein the filter includes:
an upper cover including a water outlet hole connected to the pump pipe;
a lower cover including a water inlet hole and detachably connected to the upper cover; and
a filter screen disposed between the water outlet hole and the water inlet hole.

20. The dehumidifier of claim 11, wherein the pump pipe includes a hose.

* * * * *